US008712338B2

(12) United States Patent
Liu et al.

(10) Patent No.: US 8,712,338 B2
(45) Date of Patent: Apr. 29, 2014

(54) METHOD AND SYSTEM FOR IMPLEMENTING POWER DETECTION

(75) Inventors: Dong Liu, Shenzhen (CN); Junfeng Xu, Shenzhen (CN); Fujun Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/257,785

(22) PCT Filed: May 17, 2010

(86) PCT No.: PCT/CN2010/072834
§ 371 (c)(1),
(2), (4) Date: Nov. 8, 2011

(87) PCT Pub. No.: WO2010/148828
PCT Pub. Date: Dec. 29, 2010

(65) Prior Publication Data
US 2012/0231748 A1 Sep. 13, 2012

(30) Foreign Application Priority Data
Nov. 25, 2009 (CN) .......................... 2009 1 0178388

(51) Int. Cl.
*H04B 1/38* (2006.01)
(52) U.S. Cl.
USPC .......................................................... 455/73
(58) Field of Classification Search
USPC .................. 455/525, 526, 449, 561
See application file for complete search history.

(56) References Cited

U.S. PATENT DOCUMENTS

| 6,947,768 | B2 * | 9/2005 | Adachi et al. ................. 455/560 |
| 7,031,726 | B2 * | 4/2006 | Cheng ........................ 455/456.1 |
| 7,190,930 | B2 * | 3/2007 | Ohkubo et al. ............ 455/67.11 |
| 7,599,695 | B2 * | 10/2009 | Igarashi et al. ............... 455/438 |
| 8,208,441 | B2 * | 6/2012 | Cho et al. ...................... 370/330 |
| 8,359,059 | B2 * | 1/2013 | Kim et al. ..................... 455/522 |
| 2009/0238161 | A1 * | 9/2009 | Lee ............................... 370/338 |

FOREIGN PATENT DOCUMENTS

| CN | 1633049 A | 6/2005 |
| CN | 101079664 A | 11/2007 |

OTHER PUBLICATIONS

International Search Report for PCT/CN2010/072834 dated Jul. 20, 2010.

* cited by examiner

*Primary Examiner* — Nay A Maung
*Assistant Examiner* — Maryam Soltanzadeh
(74) *Attorney, Agent, or Firm* — Ling Wu; Stephen Yang; Ling and Yang Intellectual Property

(57) ABSTRACT

The present invention discloses a method and system for implementing power detection, wherein said method includes: extracting basic information of a destination base station from a detection request, obtaining configuration information of said destination base station from a database according to the basic information, and searching available signal transmission links and power collection points of said destination base station according to the configuration information; carrying out power collection, and analyzing power values of each available power collection point on the available signal transmission link, and updating the power values of corresponding power collection points. With the present invention, power detection can be carried out on the device from a perspective of the system, and the maintainability and operability are improved.

9 Claims, 3 Drawing Sheets

METHOD AND SYSTEM FOR IMPLEMENTING POWER DETECTION

TECHNICAL FIELD

The present invention relates to the detection technical field, and particularly, to a method and system for implementing power detection.

BACKGROUND OF THE RELATED ART

With the development of the wireless communication technique, when the device manufactures pursue the continuous innovation, the device manufactures also enhance the research of maintainability of the devices at the same time, and the power detection technique is the important representative in the research of maintainability, which can know the signal quality and operation condition of the device by detecting the sending and receiving power of the signal, and has important meaning for the commercial operation.

At present, the power detection technique is becoming mature, and the means and methods of detection have different features, however, the existing power detection techniques have great limitations and drawbacks in the implementation of the scheme.

The public specification of a patent application CN200720111929.7 in China discloses a system for controlling slot power detection of the repeater station of the Time Division-Synchronous Code Division Multiple Access (TD-SCDMA), and the described power detection system is a circuit integration system, which comprises: a power collection unit, a control logic unit, a microcontroller unit and a control interface unit, and the power collection unit is composed of the 2-to-1 switch and the A/D (analog/digital) convertor; the control logic unit adopts the single chip Field Programmable Gate Array (FPGA), and its internal logic comprises an attenuator setting timing module, a power collection timing module, a power collection control module, a collection data read module, a collection data processing module, an attenuator setting control module and a data communication module; the microcontroller unit comprises one chip of the common microcontroller unit (MCU), and the control interface unit is used for implementing the function of the interface with the radio frequency module, wherein the uplink output power/downlink output power outputted by the radio frequency module interface connects with the input end of the power collection control module through the power collection unit.

Besides, the public specification of a patent application CN200820028678.0 in China discloses a TD-SCDMA power testing instrument, which comprises: a power source management part, a display part, a radio frequency part of processing and detecting the radio frequency signal and a digital part of collecting the CPU signal and processing the signal synchronization; said radio frequency part comprises a detector and a signal processing unit; said digital part comprises a CPU1 collecting the power of each slot of the signal and a CPU2 generating the synchronization signal; the detector connects with the CPU1 and CPU2 of the digital part respectively, and signal processing units are respectively configured between the detector and the CPU1 and between the detector and CPU2, and said CPU1 and CPU2 connect with each other.

SUMMARY OF THE INVENTION

The above power detection apparatuses have certain limitations in the implementation, and are unable to carry out the full tracking detection on the signal power of the wireless communication base station from a perspective of the system, and if the signal power of the wireless communication device is abnormal, the efficiency of analyzing the reason for the problem is very bad. Besides, the power detection requires a power detection device to be carried to the field for detection, which undoubtedly increases the cost.

Regarding problems such as certain limitations existing in the implementation process of the existing power detection technique, lacking for carrying out the full tracking collection and analysis on the signal power of the wireless communication device from a perspective of the system, and not high maintainability and the operability, low efficiency and lacking for a system-level solution from a perspective of the commercial operation, the technical problem to be solved in the present invention is to provide a method and system for implementing power detection, which implements to carry out the full tracking detection on the device from a perspective of the system and has higher maintainability and operability.

In order to solve the above technical problem, the present invention provides a method for implementing power detection, comprising:

extracting basic information of a destination base station from a detection request, obtaining configuration information of said destination base station from a database according to the basic information, and searching available signal transmission links and power collection points of said destination base station according to the configuration information;

carrying out power collection, and analyzing power values of each available power collection point on the available signal transmission link, and updating the power values of corresponding power collection points.

Preferably, the configuration information of said destination base station includes physical resource configuration information, wireless resource configuration information and radio frequency resource configuration information.

Preferably, a process of searching available signal transmission links and power collection points of said destination base station according to the configuration information comprises: establishing an association relationship between physical resources, wireless resources and radio frequency resources, obtaining signal transmission links, judging whether power collection points on the signal transmission links are available, and if available, obtaining available signal transmission links and power collection points.

Preferably, a process of searching available signal transmission links and power collection points of said destination base station according to the configuration information comprises: searching available power collection points from physical resources, establishing an association relationship between available power collection points and wireless resources and an association relationship between available power collection points and radio frequency resources, and obtaining the available signal transmission links.

Preferably, said power collection point includes: a channel power collection point, a data cross power collection point and a radio frequency power collection point.

In order to solve the above technical problem, the present invention provides a system for implementing power detection, comprising: a flow control module, a system planning module, a database common inquiry interface, a power collection module and a power result analysis module, wherein said flow control module is configured to: extract basic information of a destination base station from a detection request, and send the basic information to said system planning module; obtain planning information from said system planning module, and send a power collection instruction to said power collection module according to this planning information; and send a power result to said power result analysis module after receiving this power result reported by said power collection module;

said system planning module is configured to: invoke said database common inquiry interface, and obtain configuration information of said destination base station from a database according to received said basic information, and search available signal transmission links and power collection points of said destination base station according to the configuration information, and generate the planning information;

said power collection module is configured to: collect power values of power collection points, and report a collected power result to said flow control module;

said power result analysis module is configured to: analyze power values of each available power collection point on the available signal transmission link from the power result after receiving this power result sent by said flow control module, and update the power values of corresponding power collection points.

Preferably, said power collection point includes: a channel power collection point, a data cross power collection point and a radio frequency power collection point;

said power collection module correspondingly includes: a channel collection module collecting power of said channel power collection point, a data cross collection module collecting power of said data cross power collection point and a radio frequency collection module collecting power of said radio frequency power collection point.

Preferably, the configuration information of said destination base station includes physical resource configuration information, wireless resource configuration information and radio frequency resource configuration information;

said system planning module is further configured to: in a process of searching available signal transmission links and power collection points of said destination base station according to the configuration information, establish an association relationship between physical resources, wireless resources and radio frequency resources, and obtain signal transmission links, and judge whether power collection points on the signal transmission links are available, and if available, obtain available signal transmission links and power collection points; or search available power collection points from physical resources, and establish an association relationship between available power collection points and wireless resources and an association relationship between available power collection points and radio frequency resources, and obtain the available signal transmission links.

Preferably, the system further comprises a human-machine interaction module; wherein said power result analysis module is further configured to: send analyzed power values of each available power collection point on available signal transmission links to said flow control module;

said flow control module is further configured to: send power values of each available power collection point on the available signal transmission links to said human-machine interaction module;

said human-machine interaction module provides an interface for browsing said power values for operation users.

Preferably, said planning information includes corresponding relationship information of available power collection points and power collection modules.

Preferably, said physical resource configuration information includes: a board name, a board rack and frame, slot information and optical interface connection relationship information;

said wireless resource configuration information includes cell information, carrier frequency information, channel resource grouping information and sector information;

said radio frequency resource configuration information includes: radio frequency system information and radio frequency carrier information.

As a conclusion, the present invention carries out analysis and planning on the device from a perspective of the system, and explicitly processes the signal transmission link and plans the power collection points based on this, and carries out the module division on the power collection points, and collects all the power collection points of this module at once so as to achieve the high effectiveness and unity of the collection, and recovers the modularized power results to the power results of each power collection point. The present invention enhances the power detection technique to the system level, and closely combines with the commercial operation, and greatly improves the systematization and intelligence of the power detection technique.

PREFERRED EMBODIMENTS OF THE PRESENT INVENTION

Figure 1:
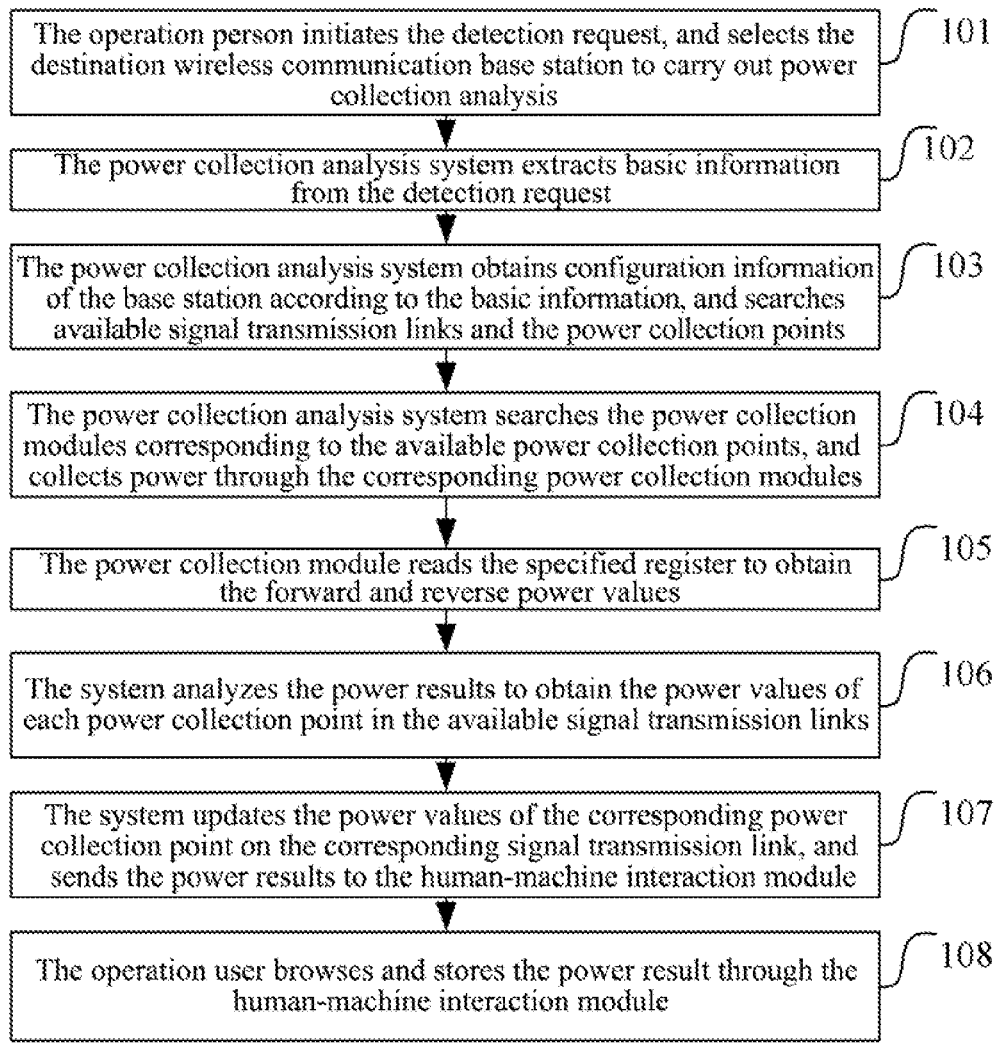
FIG. 1 is a flow chart of the method for implementing power detection according to the embodiment of the present invention.

Below it will describe the specific embodiment of the present invention with reference to figures.

Below it will describe the method for implementing the power detection according to the embodiment of the present invention regarding the process of the power collection and analysis of one wireless communication base station, and this method comprises:

step 101, the power collection analysis system provides the human-machine interface and operation instructions, and the operation person initiates the detection request, and selects the destination wireless communication base station to carry out power collection analysis;

step 102, the power collection analysis system (which will be briefly called as the system below) extracts basic information from the detection request, and the basic information includes the base station identification number and the office number and so on;

step 103, the power collection analysis system obtains physical resource configuration information, wireless resource configuration information and radio frequency resource configuration information of the wireless communication base station from the database according to the extracted basic information, and searches available signal transmission links and the power collection points;

the power collection analysis system can establish the association relationship between the physical resources, wireless resources and radio frequency resources, and obtain the signal transmission links, and judge whether power collection points on the signal transmission links are available, thereby obtaining the available signal transmission links and power collection points.

The power collection analysis system also can search the available power collection points from the physical resources, and establish the association relationship of the available power collection points with wireless resources and radio frequency resources, and obtain the available signal transmission links.

Step 104, the power collection analysis system searches the power collection modules corresponding to the available power collection points, and collects power through the corresponding power collection modules;

step 105, the power collection module reads the specified register so as to obtain the forward and reverse power values;

step 106, the system analyzes the power results to obtain the power values of each power collection point in the available signal transmission links;

step 107, the system updates the power values of the corresponding power collection point on the corresponding signal transmission link, and sends the power results to the human-machine interaction module;

step 108, the operation user browses and stores the power result through the human-machine interaction module.

Certainly, the method of the present invention is not limited to be implemented only by the above power collection analysis system, and any other systems integrating the method of the present invention are all able to be used to implement the method of the present invention.

Figure 2:
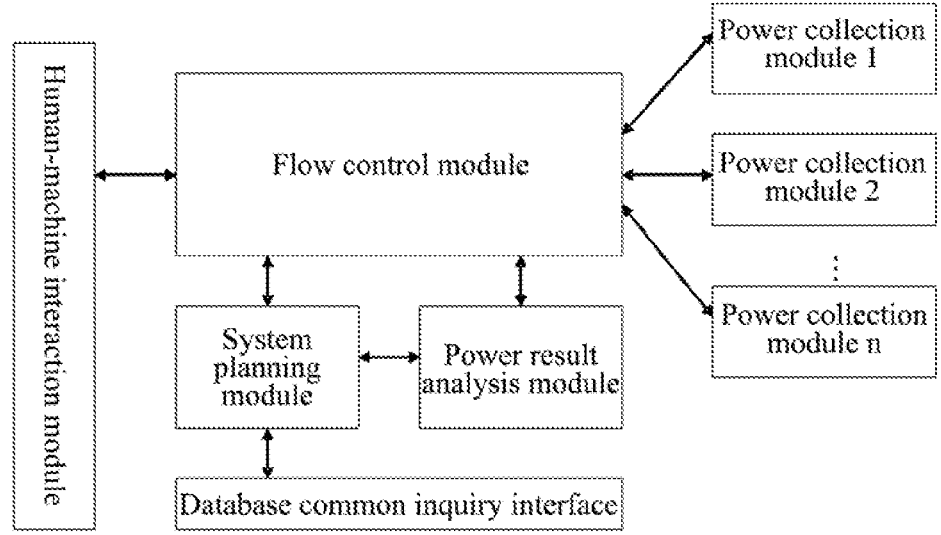
FIG. 2 is a structure diagram of the system for implementing power detection according to the embodiment of the present invention.

FIG. 2 shows the system for implementing the power detection according to the embodiment of the present invention, and comprises:

a human-machine interaction module, which provides the human-machine interaction interface, and the operation instructions include starting and stopping the power detection and browsing, inquiring and storing the power result. In the aspect of the data interaction, the human-machine interaction module sends the operation instructions to the flow control module through the network management system internal interface, and receives the power result data distributed by the flow control module in the way of subscribing asynchronous message. In the aspect of network design, the distributed architecture is supported, and the number of the human-machine interaction modules can be configured according to the practical network planning The flow control module, implements the whole flow control so as to ensure the normal operation of the system, the correct analysis of the result and the self-recovery of the abnormal state. In the aspect of data interaction, the flow control module receives the operation instructions from the human-machine interaction module to analyze and extract the basic information, and sends the basic information to the system planning module; and obtains the planning information from the system planning module, and the planning information includes: the corresponding relationship information of the available power collection points and power collection modules; and sends the power collection instructions to the power collection module according to the planning information, and if the planning information is not obtained, then sends the end instruction to the human-machine interaction module.

The way of the data interaction of the flow control module and the power collection module is the asynchronous message, and the flow control module sends the power result to the power result analysis module after receiving the power result reported by the power collection module, and sends the received power value of the power collection point sent by the power result analysis module to the human-machine interaction module.

Since there is a plurality of human-machine interaction modules, thus the power result is distributed to the human-machine interaction modules by the way of the broadcast. Besides, the self-recovery of the abnormal state adopts the timeout strategy, and the timeout strategy can be flexibly configured, and can be configured according to the maximum collection time of the power collection module of the network element device, which ensures the retrieve of the system resources and the release of the memory after timing out.

The system planning module, receives the basic information of the flow control module, uses the database common inquiry interface, obtains the physical resource configuration information, wireless resource configuration information and radio frequency resource configuration information, analyzes the system according to the above configuration information, implements the explicitness of the signal transmission link, and plans the power collection points and power collection modules. The explicitness of the signal transmission link is relative to the user, and physical resources such as the boards and optical interfaces and so on are obvious to users in the system, but the association of the wireless resources with the physical resources and the radio frequency resources is implicit, and this stage is mainly to associate the wireless resources, physical resources and radio frequency resources; and search the available signal transmission links and power collection points, and generate the planning information;

the system planning module can obtain the transmission link (the signal transmission link) of the signal in the wireless communication device according to the association relationship between the physical resource configuration information, the wireless resource configuration information and the radio frequency resource configuration information, and one signal transmission link should include the baseband physical resources, wireless resources and radio frequency resources, and on the signal transmission link, the power collection points are defined on different modules according to the hardware architecture of the wireless communication device so as to achieve the full tracking of the signal power.

The database common inquiry interface, implements the inquiry operation of the database, including the physical resource configuration information (the board name, board rack and frame, slot information and optical interface connection relationship information), wireless resource configuration information (cell information, carrier frequency information, channel resource grouping information and sector information) and radio frequency resource configuration information (radio frequency system information and the radio frequency carrier information) of the wireless communication device.

The power collection module, resides in each board module of the wireless communication device, and is responsible for collecting the power value of power collection point of each module, and the collection operations of the power value are completed by the software reading the forward and reverse power registers of the hardware, and after the collection succeeds, the power of all the power collection points of this module is reported to the flow control module.

The power result analysis module, analyzes the power result after receiving the power result sent by the flow control module, and obtains the power of each power collection point, then updates the power value of the corresponding power collection point on the corresponding signal transmission link according to the wireless, physical and radio frequency resource information of each power collection point, and sends power values to the flow control module.

Figure 3:
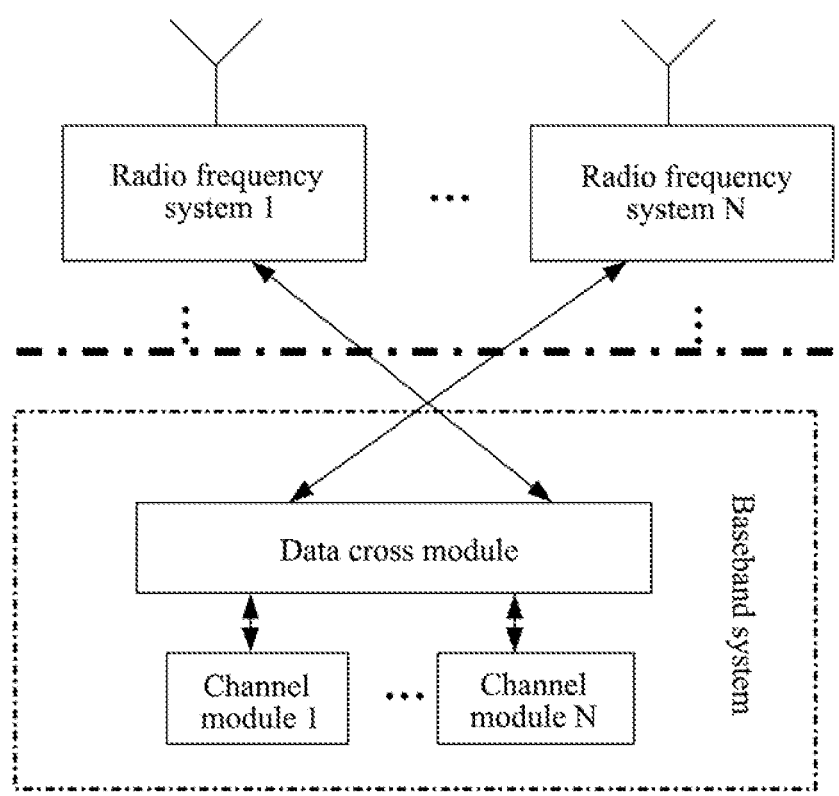
FIG. 3 is a structure diagram of the base station for the detection according to the present invention.
Figure 4:
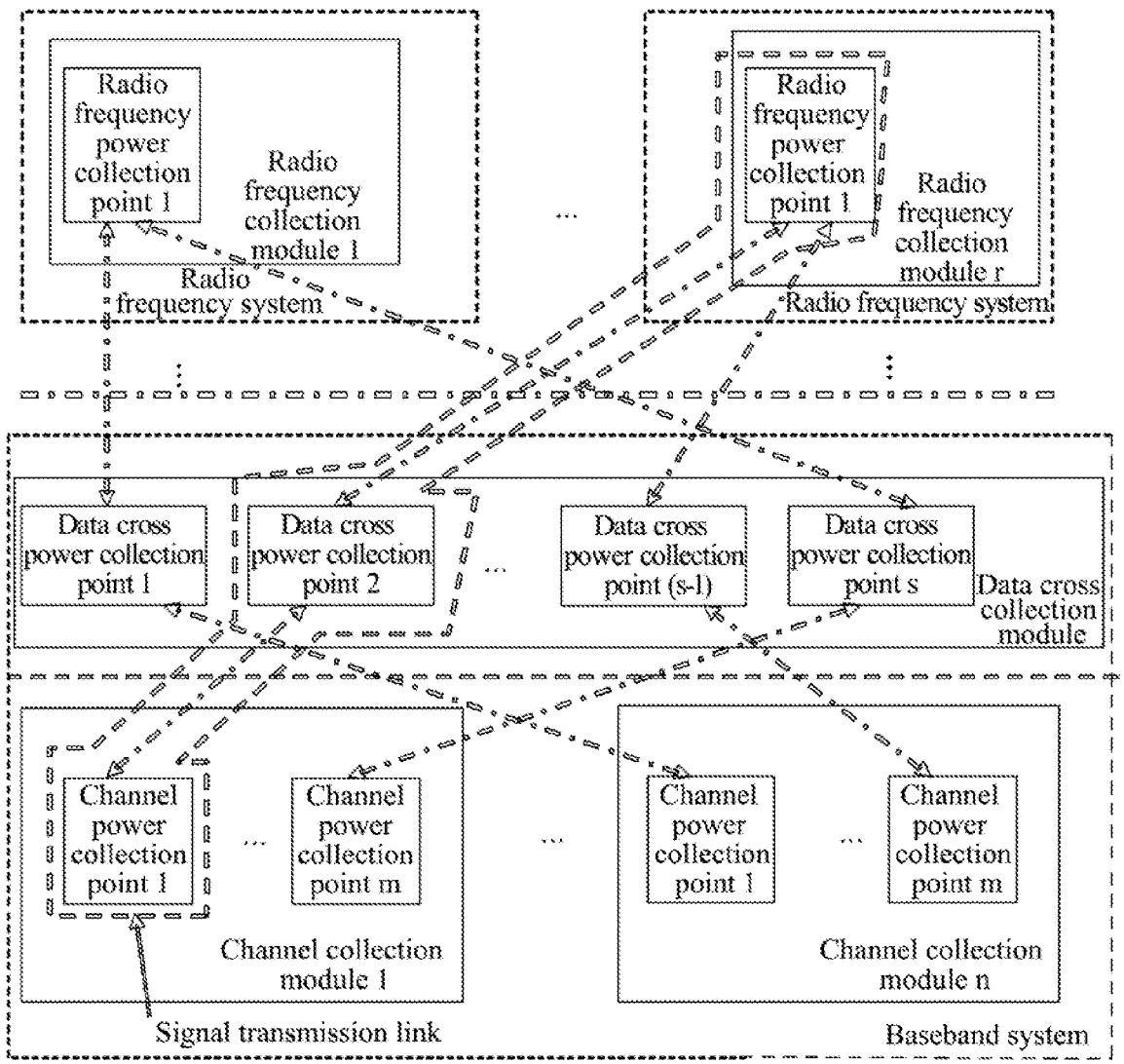
FIG. 4 is a schematic diagram of carrying out power collection according to the embodiment of the present invention.

FIG. 3 shows the schematic diagram of the basic structure of the wireless communication base station, and comprises a baseband system and a plurality of radio frequency systems, and the baseband system comprises a data cross module and a plurality of channel modules, and in order to adapt to this kind of the base station, the power collection can be carried out by adopting the way shown in FIG. 4.

FIG. 4 shows the schematic diagram of the power collection, wherein the power collection point can be divided into the channel power collection point, the data cross power collection point and the radio frequency power collection point according to the hardware architecture of the wireless communication device and the practical physical, wireless and radio frequency configuration information, and the definition way can be flexibly adjusted according to the hardware architecture, which is not limited to this. The purpose of defining the power collection point is convenient for the full tracking of the signal power without missing.

Accordingly, the power collection module based on the definition of the power collection point is divided into: a channel collection module, a data cross collection module and a radio frequency collection module, and the configuration way varies with the power collection point. The power collection module collects the power of the power collection points which have the same physical module features, and the purpose of defining the power collection module is convenient for the power collection module carrying out mass and efficient collection of power.

The signal transmission link (which is circled by the line frame in the figure) is the transmission path of the signal in the wireless communication device, and the signal transmission link is obtained combining the physical, wireless, and radio frequency resources and the hardware architecture, and the signal transmission link also can be seen as the set of the power collection points with the same physical, wireless and radio frequency resource attributes.

The present invention carries out the full tracking detection, collection and analysis on the signal power of the wireless communication device from a perspective of the system and user instead of carrying out detection by going to the station, and can check and browse the result in the central machine room, which greatly improves the maintainability and operability of the wireless communication device during the commercial operation, and greatly reduces the cost of the maintenance.

Although the present invention is described with reference to specific examples, modifications and transformations can be made by those skilled in the art without departing from the spirit or scope of the present invention. Such modifications and transformations shall all be considered to fall into the scope of the present invention and the appended claims.

INDUSTRIAL APPLICABILITY

The present invention provides a method and system for implementing power detection, which carries out analysis and planning on the device from a perspective of the system, and explicitly processes the signal transmission link and plans the power collection points based on this, and carries out the module division on the power collection points, and collects all the power collection points of this module at once so as to achieve the high effectiveness and unity of the collection, and recovers the modularized power results to the power results of each power collection point. The present invention enhances the power detection technique to the system level, and closely combines with the commercial operation, and greatly improves the systematization and intelligence of the power detection technique.

What is claimed is:

1. A method for implementing power detection integrated into a system for a power collection and analysis, the method comprising:

the power collection and analysis extracting by the system, from a detection request, basic information of a destination base station which includes a base station identification number, invoking a database common inquiry interface to obtain configuration information of said destination base station from a database according to the basic information, and searching available signal transmission links and power collection points of said destination base station according to the configuration information;

the power collection and analysis collecting power values of the power collection points, and analyzing power values of each available power collection point on the available signal transmission link, and updating the power values of corresponding power collection points by the system;

wherein, the configuration information of said destination base station includes physical resource configuration information, wireless resource configuration information and radio frequency resource configuration information;

said physical resource configuration information includes: a board name, a board rack and frame, slot information and optical interface connection relationship information;

said wireless resource configuration information includes cell information, carrier frequency information, channel resource grouping information and sector information;

said radio frequency resource configuration information includes: radio frequency system information and radio frequency carrier information.

2. The method as claimed in claim 1, wherein a process of searching available signal transmission links and power collection points of said destination base station according to the configuration information comprises: establishing an association relationship between physical resources, wireless resources and radio frequency resources, obtaining signal transmission links, judging whether power collection points on the signal transmission links are available, and if available, obtaining the available signal transmission links and power collection points.

3. The method as claimed in claim 1, wherein a process of searching available signal transmission links and power collection points of said destination base station according to the configuration information comprises: searching available power collection points from physical resources, establishing an association relationship between the available power collection points and wireless resources and an association relationship between the available power collection points and radio frequency resources, and obtaining the available signal transmission links.

4. The method as claimed in claim 1, wherein said power collection point includes: a channel power collection point, a data cross power collection point and a radio frequency power collection point.

5. A system for implementing power detection, comprising: a flow control module, a system planning module, a database common inquiry interface, a power collection module and a power result analysis module, wherein said flow control module is configured to: extract, from a detection request, basic information of a destination base station which includes a base station identification number, and send the basic information to said system planning module;

said system planning module is configured to: invoke said database common inquiry interface, and obtain configuration information of said destination base station from a database according to the received basic information, and search available signal transmission links and power collection points of said destination base station according to the configuration information, and generate planning information;

said flow control module is further configured to: obtain the planning information from said system planning module, and send a power collection instruction to said power collection module according to this planning information;

said power collection module is configured to: collect power values of the power collection points belonging to the power collection module itself, and report a collected power result to said flow control module;

said flow control module is further configured to: send the power result to said power result analysis module after receiving this power result reported by said power collection module;

said power result analysis module is configured to: analyze power values of each available power collection point on the available signal transmission link from the power result after receiving this power result sent by said flow control module, and update the power values of corresponding power collection points;

wherein, the configuration information of said destination base station includes physical resource configuration information, wireless resource configuration information and radio frequency resource configuration information;

said physical resource configuration information includes: a board name, a board rack and frame, slot information and optical interface connection relationship information;

said wireless resource configuration information includes cell information, carrier frequency information, channel resource grouping information and sector information;

said radio frequency resource configuration information includes: radio frequency system information and radio frequency carrier information.

6. The system as claimed in claim 5, wherein said power collection point includes: a channel power collection point, a data cross power collection point and a radio frequency power collection point;

said power collection module correspondingly includes: a channel collection module collecting power of said channel power collection point, a data cross collection module collecting power of said data cross power collection point and a radio frequency collection module collecting power of said radio frequency power collection point.

7. The system as claimed in claim 5, wherein said system planning module is further configured to: in a process of searching available signal transmission links and power collection points of said destination base station according to the configuration information, establish an association relationship between physical resources, wireless resources and radio frequency resources, and obtain signal transmission links, and judge whether power collection points on the signal transmission links are available, and if available, and obtain the available signal transmission links and power collection points; or search available power collection points from the physical resources, and establish an association relationship between the available power collection points and the wireless resources and an association relationship between the available power collection points and the radio frequency resources, and obtain the available signal transmission links.

8. The system as claimed in claim 5, further comprising a human-machine interaction module; wherein said power result analysis module is further configured to: send analyzed power values of each available power collection point on the available signal transmission links to said flow control module;

said flow control module is further configured to: send power values of each available power collection point on the available signal transmission links to said human-machine interaction module;

said human-machine interaction module provides an interface of browsing said power values for operation users.

9. The system as claimed in claim 5, wherein said planning information includes corresponding relationship information of available power collection points and the power collection modules.

\* \* \* \* \*